United States Patent
Neal et al.

(10) Patent No.: US 9,791,076 B2
(45) Date of Patent: Oct. 17, 2017

(54) SWAGE VISUAL INDICATOR FOR FLUID COUPLING

(71) Applicant: Eaton Corporation, Cleveland, OH (US)

(72) Inventors: Jon Wallace Neal, Denver, CO (US); Robert Charles Shown, Broomfield, CO (US); Clifton P. Breay, Littleton, CO (US)

(73) Assignee: Eaton Corporation, Cleveland, OH (US)

( * ) Notice: Subject to any disclaimer, the term of this patent is extended or adjusted under 35 U.S.C. 154(b) by 665 days.

(21) Appl. No.: 13/922,872

(22) Filed: Jun. 20, 2013

(65) Prior Publication Data

US 2013/0277960 A1    Oct. 24, 2013

(51) Int. Cl.
| | | |
|---|---|---|
| *F16L 19/00* | (2006.01) | |
| *F16L 19/028* | (2006.01) | |
| *F16L 13/14* | (2006.01) | |
| *F16L 19/02* | (2006.01) | |

(Continued)

(52) U.S. Cl.
CPC ......... *F16L 19/028* (2013.01); *F16L 13/147* (2013.01); *F16L 19/0206* (2013.01); *F16L 25/01* (2013.01); *B29L 2023/22* (2013.01); *F16L 2201/10* (2013.01); *Y10T 29/49826* (2015.01)

(58) Field of Classification Search
CPC .... B21D 39/046; F16L 13/147; F16L 19/028; F16L 19/0206; F16L 25/01; F16B 1/0071; F16B 31/02

USPC ....... 138/109, 118.1, 155, 104, 124; 403/27; 285/93

See application file for complete search history.

(56) References Cited

U.S. PATENT DOCUMENTS

| | | | | |
|---|---|---|---|---|
| 2,679,414 A | * | 5/1954 | Hornschuch | F16D 1/02 403/307 |
| 3,730,567 A | | 5/1973 | Webster | |

(Continued)

FOREIGN PATENT DOCUMENTS

| | | |
|---|---|---|
| AT | 507566 | 6/2010 |
| DE | 19856769 | 5/2000 |

OTHER PUBLICATIONS

International Search Report and Written Opinion for International (PCT) Application No. PCT/US2014/042031, mailed Sep. 11, 2014, 10 pages.

(Continued)

*Primary Examiner* — Charles P Cheyney
(74) *Attorney, Agent, or Firm* — Fishman Stewart PLLC (57) ABSTRACT

A swage visual indicator for a fluid coupling is disclosed and related methods. The swage visual indicator is achieved by a non-destructive visual indication of a swaging process by one or more swage apertures formed through a flange filled with an indicator material. The swage apertures communicate with swaging grooves of the fluid conveying components being joined. As the swaging process is conducted, the swaging grooves are filled with material from one of the fluid conveying components, and the indicator material within the aperture(s) is therefore displaced in a direction toward the exposed exterior surface of the flange. According to a successful swaging process, the indicator material is displaced to a degree such that the indicator material is visible by the unaided eye of an inspector.

18 Claims, 4 Drawing Sheets

(51) Int. Cl.
*F16L 25/01* (2006.01)
*B29L 23/00* (2006.01)

(56) References Cited

U.S. PATENT DOCUMENTS

| | | | |
|---|---|---|---|
| 4,524,998 A * | 6/1985 | Brisco | E21B 17/08 |
| | | | 166/70 |
| 4,919,455 A * | 4/1990 | Yoshiro | F16L 19/025 |
| | | | 285/23 |
| 5,010,952 A | 4/1991 | Chin et al. | |
| 5,113,551 A | 5/1992 | Roberts | |
| 5,152,630 A | 10/1992 | Walloch | |
| 5,280,967 A * | 1/1994 | Varrin, Jr. | F16B 31/028 |
| | | | 285/382.7 |
| 5,303,958 A | 4/1994 | Hyatt et al. | |
| 5,452,921 A | 9/1995 | Hyatt et al. | |
| 5,743,333 A * | 4/1998 | Willauer | E21B 33/1277 |
| | | | 166/122 |
| 5,746,555 A | 5/1998 | McEvoy | |
| 6,050,609 A | 4/2000 | Boscaljon et al. | |
| 6,183,904 B1 | 2/2001 | Kuboshima et al. | |
| 6,409,222 B1 | 6/2002 | Donoho et al. | |
| 6,463,778 B1 | 10/2002 | Johnston | |
| 6,609,865 B2 | 8/2003 | Daigneault | |
| 6,640,457 B2 * | 11/2003 | Williams | F16L 19/00 |
| | | | 285/93 |
| 6,880,859 B2 | 4/2005 | Breay et al. | |
| 7,028,375 B1 * | 4/2006 | Schaefer | B25G 3/00 |
| | | | 15/145 |
| 7,493,961 B2 * | 2/2009 | Scott | E21B 43/119 |
| | | | 166/380 |
| 7,900,976 B2 | 3/2011 | Kainec | |
| 8,177,590 B2 | 5/2012 | Tanaka et al. | |
| 2006/0022454 A1 | 2/2006 | Le Clinche et al. | |
| 2009/0223584 A1 | 9/2009 | Gray | |
| 2011/0199220 A1 * | 8/2011 | McAlister | B01J 19/127 |
| | | | 340/605 |
| 2013/0233435 A1 * | 9/2013 | Henthorn | F16L 25/065 |
| | | | 138/155 |

OTHER PUBLICATIONS

"BOBTAIL® Huck's next generation lockbolt." Alcoa Fastening Systems, Nov. 2010, 12 pages.

* cited by examiner

SWAGE VISUAL INDICATOR FOR FLUID COUPLING

FIELD OF THE INVENTION

The invention relates to fluid conveying members connected to one another such as by a coupling device, and more particularly, to fluid conveying members having ends that incorporate corresponding flanges secured to coupling devices in which the fluid conveying members and flanges are joined by a swaging process.

BACKGROUND OF THE INVENTION

There are numerous inventions relating to fluid conveying members or conduits, and various coupling devices that can be used to interconnect fluid conveying members. The particular design of the coupling device, as well as the design of the fluid conveying members is typically determined by the special requirements associated with the type of fluid being conveyed. For conveying non-volatile fluids such as water, a coupling device may be afforded a more simple construction, since potential leakage in many applications may not introduce a significant health or safety concern. On the contrary, for fluid conveying members that convey fuel or other volatile or hazardous liquids, the construction of the coupling device and fluid conveying members typically requires redundant sealing features, as well as redundant locking or tamper proofing features.

For fluid conveying members that convey fuel that are used within particularly hazardous applications such as within an aircraft, stringent industry standards have been developed to ensure safety in the handling of fuel. Any leakage of fuel within such an environment could result in a catastrophic fire or explosion.

Fluid conveying members in aircraft are typically connected to one another with robust and reliable couplers that ensure a leak proof seal is achieved between the connected fluid conveying members. The abutting ends of the fluid conveying members include a metallic flange that is received within and held by the coupler. The metallic flange is often attached to the end of the fluid conveying tube by a swaging process in which the flange or tube is swaged, and therefore a fluid tight seal is achieved between the flange and tube end.

One example of a reference that discloses a swaged fitting includes the U.S. Pat. No. 5,452,921. The fitting is used in an attachment to a tube comprising a cylindrical sleeve having a tapered outer surface and an inner surface for receiving the tube. A cylindrical swaging ring having a tapered inner surface engages the tapered outer surface of the sleeve such that axial movement of the ring in a forward direction with respect to the sleeve causes the ring to apply a radial force to the sleeve to swage it to the tube. The swaging ring is locked onto the sleeve both before and after swaging by one or more protrusions on the outer surface of the sleeve which cooperatively engage an annular groove in the swaging ring.

Another example of a reference that discloses a swaged configuration for tubing and an associated sleeve or flange includes the U.S. Pat. No. 3,730,567. Specifically, a coupling sleeve for a swaged attachment to tubing is disclosed. The sleeve has a pair of annular grooves of a predetermined depth provided in the inner peripheral wall with the grooves being separated by an annular ring raised from the floor of the grooves. The width of the annular ring in the axial direction is such that tubing swaged into the grooves tends to assume a separate bend adjacent each land edge and to remain essentially flat in the area intermediate the two edges. The inner diameter of the cylindrical body in the area of the annular ring is arranged such that it is less than the inner diameter of the body in the area of the annular grooves and greater than the inner diameter of the cylindrical body in the area remote from the grooves thereby resulting in a two stage application of force to the tube walls during the swaged attachment operation.

Another example of a reference that discloses a swaged connection for tubing and an associated coupling device includes the U.S. Pat. No. 7,900,976. The device includes a coupling body and a collar adapted to engage a tubular member in a permanent swaged connection. The coupling device includes axially spaced front and back ferrules that engage during swaging to provide a plurality of seals intermediate the ferrules and the tubular member as well as the coupling body. The back ferrule includes a central region having a generally cylindrical wall that is elastically deformed to a corrugated tube-like shape during swaging to enhance the maintenance of the seals. A portable installation tool for swaging the coupling body and collar to the tubular member is hydraulically actuated.

With respect to a swaged connection between a fluid conveying member such as a tube/pipe and a corresponding flange/ferrule, there are generally two types of swaging processes. Internal swaging is a process by which the internal member (the tube/pipe) is internally expanded to compress the tube/pipe material against the interior surface of the corresponding flange/ferrule. Such internal swaging can be achieved by pulling a hardened tool of a larger diameter through the interior of the tube/pipe in order to expand it against the interior surface of the flange/ferrule. External swaging is a swaging process in which the outer flange/ferrule is compressed onto the interior tube/pipe. External swaging can be achieved by pushing the components to be joined through a hardened die having an interior diameter smaller than the external diameter of the flange/ferrule. In both cases, the compressive force applied to the components causes material to flow into the serrated cavities, thus providing a secure mechanical bond that is leak proof.

Although swaging is known to be a reliable method of joining a flange and tube for purposes of conveying hazardous fluids, quality control checks must still be made in order to confirm that a swaging process has been successful in creating a leak proof connection. The current practice used for quality control involves destructive testing of a statistical sampling of swaged connections. Specifically, swaged samples or "coupons" are cross-sectioned to analyze the joint or connection to determine the quality of the swaged connection. Since this destructive sampling is only done on a statistical basis, there is still the potential for fluid conveying members to be used in which a swaged connection may not be entirely adequate for the intended use.

Because of the inherent disadvantages of statistical sampling and destructive testing, there is a need to provide the capability to confirm the adequacy of a swaged connection, especially for those environments in which volatile fluids are conveyed. There is also a need to provide such capability without significantly altering the construction of the fluid conveying line, flange, or coupling device. There is yet further a need to provide such capability that is easily confirmed by a user or inspector, without the need for special inspecting equipment.

SUMMARY OF THE INVENTION

In accordance with the present invention, a swage visual indicator for a fluid coupling and a method of performing a quality test for a swaged connection are disclosed. The swage visual indicator is achieved by a non-destructive visual indication of a swaging process by one or more swage apertures formed through a flange filled with an indicator material. The aperture(s) is located in alignment with a swaging groove of the flange. As the swaging process is conducted, tubing material is forced into swaging grooves of the flange. The indicator material has a portion thereof that extends into the corresponding groove prior to swaging. As tube material enters the groove, the indicator material is displaced in a direction toward the exposed exterior surface of the flange. More specifically, as the swaging takes place, the tube material compressed into the groove forces the indicator material out of the groove and toward the exterior surface through the aperture. In a successful swaging process, the indicator material is displaced to a degree such that the indicator material is visible by an unaided visual inspection.

In one aspect of the visual indicator, it incorporates use of indicator material that is visually distinct from the surrounding materials, and is capable of being displaced such that the indicator material provides a consistent and reliable indication of whether the swaging process was successful.

In another aspect of the visual indicator, it incorporates use of the indicator material in a desired volume retained within one or more apertures formed in the flange, such that when the swaging process is conducted, an adequate amount of the indicator material is displaced so the indicator material can be seen easily by the naked eye to confirm whether the swaging process was successful. Accordingly, a visual inspection can be made to avoid a destructive testing method.

In yet another aspect of the visual indicator, it includes use a softer material as compared to the flange, such that the indicator material is capable of deformation and displacement under a cold formed swaging process. Many swaging processes are cold forming processes in which the swaged connection does not require heating. Accordingly, the indicator material in one preferred embodiment includes a material that is capable of easily being displaced in temperatures a cold forming process takes place.

In another aspect of the visual indicator, is preferable that the indicator material be resistant to galvanic corrosion, thereby not compromising the connection between the fluid conveying member, and flange.

In yet another aspect of the visual indicator, it is preferable that the indicator material be electrically conductive to the same order of magnitude as the adjacent components being swaged, therefore the indicator material will not interfere with the desired conductivity of the connection.

In yet another aspect of the invention, if the particular material chosen for the indicator material is not electrically conductive to the desired degree, then the location of the indicator material is placed so that it does not interfere with the conductivity of bonding wires or bonding clips that may be used for achieving electrical bonding of the associated coupling device.

In yet another aspect of the invention, a plurality of visual indicators are provided on the joint between a flange and fluid conveying member in which the visual indicators are spaced from one another radially around the circumference of the flange in a spiral arrangement. The spiral arrangement allows visual confirmation that the swaging operation was successful, both radially and axially throughout the joint. This spiral arrangement also reduces the potential that a linear set of apertures would introduce an unacceptably weakened area along the flange.

In yet another aspect of the invention, it can be considered a combination including a pair of abutting flanges with corresponding conveying tubes joined by a coupling device. This combination provides a leak proof connection for axially aligned fluid conveying members in which both flanges can be inspected for adequate swaging between the flanges and their corresponding fluid conveying members.

According to the method of the invention, one or more apertures formed in the flange are filled with indicator material. Each aperture has a measured volume of indicator material such that when a swaging process is conducted, the indicator material is displaced within the apertures a distance within the apertures to allow visual inspection. In one aspect of the method, displacement of the indicator material is achieved within the apertures such that the indicator material is flush or nearly flush with the exposed exterior surface of the flange, therefore indicating that a proper swaging process has been conducted. Conversely, if the indicator material still remains recessed within the aperture and is not readily visible, then a conclusion can be drawn that the swaging process was not successful because the swaging did not result in adequate expansion or deformation of the tube or flange materials.

Considering the above features and aspects of the invention, in accordance with one preferred embodiment, the invention can be considered a visual indicator for a fluid coupling comprising (i) a fluid coupling component having a sidewall defining a hollow interior, and a plurality of grooves formed on an interior surface of said sidewall; (ii) an aperture formed through said sidewall and intersecting one of said grooves; (iii) indicator material placed in said aperture; and (iv) a fluid conveying member connected to said fluid coupling component by a swaging process in which material from said fluid conveying member is compressed into said grooves, thereby displacing said indicator material within said aperture.

In accordance with another embodiment, the invention can be considered a method of providing a visual indicator for a fluid conveying member, comprising (i) providing a fluid coupling component having a sidewall defining a hollow interior, and a plurality of grooves formed on an interior surface of said sidewall; (ii) forming an aperture through said sidewall and intersecting one of said grooves; (iii) placing indicator material in said aperture such that said indicator material has a first end extending beyond said aperture into said groove, and a second end of said indicator material is retained within said aperture; (iv) providing a fluid conveying member and inserting one end of said fluid conveying member within said fluid coupling component; and (v) conducting a swaging process in which material from said fluid conveying member is compressed into said grooves, thereby displacing said indicator material within said aperture.

In accordance with yet another embodiment, the invention can be considered a method of performing a visual inspection of a swaged connection, comprising (i) providing a swaged joint between a fluid coupling component and a fluid conveying member, wherein an aperture is formed through a sidewall of said fluid coupling component, and said aperture is filled with indicator material; (ii) viewing said aperture to determine whether said indicator material is visible; wherein if said indicator material is visible, then it is concluded that proper swaging was conducted in which an adequate amount material from said fluid conveying member entered and filled swaging grooves of said fluid coupling component during swaging; and further wherein if said indicator material is not visible, then it is concluded that improper swaging was conducted in which an inadequate amount of material from said fluid conveying member entered said swaging grooves during swaging.

In yet another embodiment, the invention can be considered a combination including a fluid coupling and a visual indicator for a fluid coupling to determine adequacy of swaged joints in said fluid coupling, comprising (i) a first fluid coupling component connected to a corresponding first fluid conveying member by a swaged connection, said first fluid coupling component having a sidewall defining a hollow interior, and a plurality of grooves formed on an interior surface of said sidewall filled with material from said first fluid conveying member during swaging; (ii) a second fluid coupling component connected to a corresponding second fluid conveying member by a swaged connection, said second fluid coupling component having a sidewall defining a hollow interior, and a plurality of grooves formed on an interior surface of said sidewall filled with material from said second fluid conveying member during swaging; (iii) a first aperture formed through said sidewall of said first fluid coupling component and intersecting one of said grooves of said first fluid coupling component; (iv) a first indicator material placed in said first aperture, wherein said first indicator material is visible by viewing said first fluid coupling component after swaging if proper swaging was conducted; (v) a second aperture formed through said sidewall of said second fluid coupling component and intersecting one of said grooves of said second fluid coupling component; (vi) a second indicator material placed in said second aperture, wherein said second indicator material is visible by viewing said second fluid coupling component after swaging if proper swaging was conducted; and (vii) a fluid coupler interconnecting facing ends of said first and second fluid coupling components.

DETAILED DESCRIPTION OF THE INVENTION

Figures 1, 2:
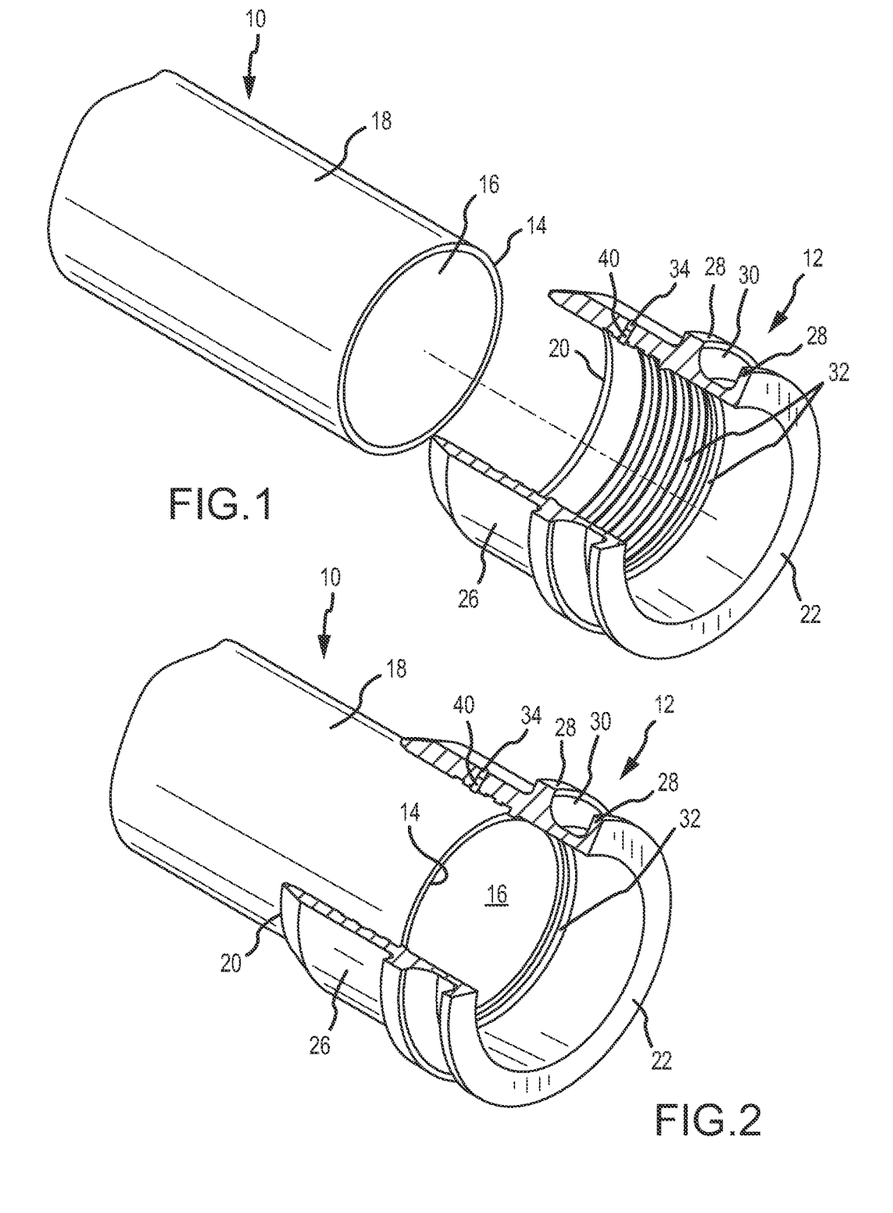
FIG. 1 is an exploded fragmentary perspective view of a fluid conveying member in the form of a tube, and a flange to be joined to one another in a swaging process.
FIG. 2 is a fragmentary perspective view of FIG. 1 showing the tube and flange connected prior to swaging.

FIG. 1 illustrates an example fluid conveying member in the form of a tube 10 and an example flange 12 that is used to interconnect the tube 10 to a coupler (not shown). The flange 12 illustrated in FIG. 1 is representative of flanges commonly used for coupling devices used to interconnect fluid conveying members that convey volatile fluids. Examples of US patent references that disclose coupling devices that incorporate similar tube and flange combinations include U.S. Pat. Nos. 6,050,609 and 6,880,859. These two references are incorporated by reference herein in their entirety for purposes of disclosing example coupling devices used to interconnect facing ends of fluid conveying members that are specially designed for carrying volatile fluids such as fuel.

FIG. 1 further shows basic features of the tube 10 and flange 12. The tube has a distal end 14 that is inserted into the flange 12. The interior surface 16 of the tube 10 comes into contact with the fluid conveyed. The exterior surface 18 of the tube is typically smooth. The flange has a proximal end 20 that receives the distal end 14 of the tube 10. The distal end 22 of the flange 12 has a rib or rim 28 formed thereon. The rim 28 has a channel 30 that is adapted to receive a resilient and flexible sealing element, such as an O-ring (not shown). The interior surface of the flange 12 has a plurality of swaging grooves 32 spaced from one another longitudinally along a portion of the flange. An indicator aperture 34 is formed through the flange.

Figure 3:
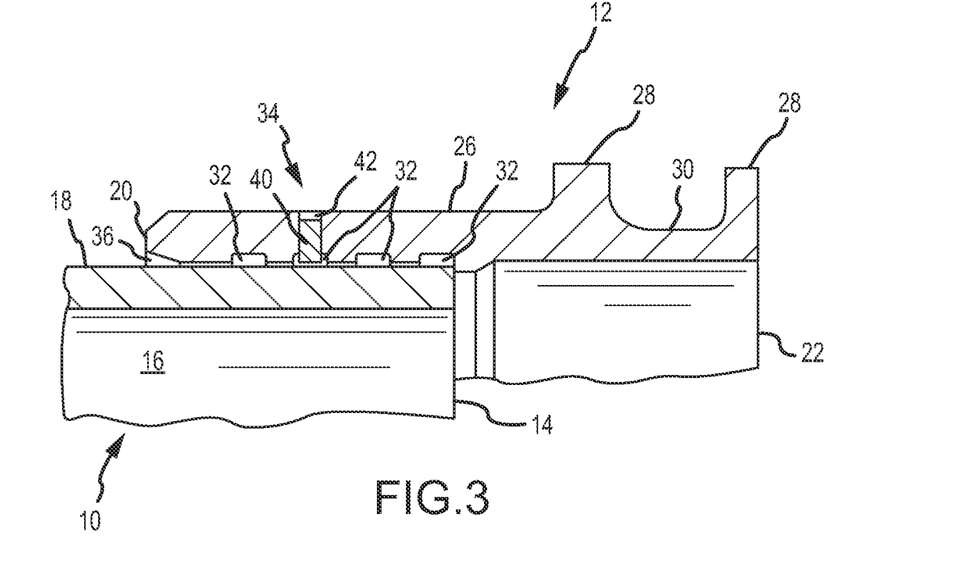
FIG. 3 is an enlarged fragmentary cross-sectional view illustrating the tube and flange connected prior to swaging, and indicator material filling an aperture formed in the flange according to a preferred embodiment of the invention.

Referring to FIGS. 2 and 3, the tube is inserted within the flange 12, and is located in the proper position for the ensuing swaging operation. Accordingly, the distal end 14 of the tube 10 is located at or near the most interior groove 32. The indicator aperture 34 extends through the sidewall of the flange 12 and is aligned with one of the swaging grooves 32. FIG. 3 also shows indicator material 40 placed within the aperture 34. The indicator material 40 may be in the form of a cylindrical shaped "slug" with an end thereof that protrudes into the corresponding groove 32 prior to swaging. FIG. 3 also illustrates an expanded interior edge 36 of the flange 12 at the proximal end 20 forming a gap between the exterior surface 18 of the tube.

Figure 4:
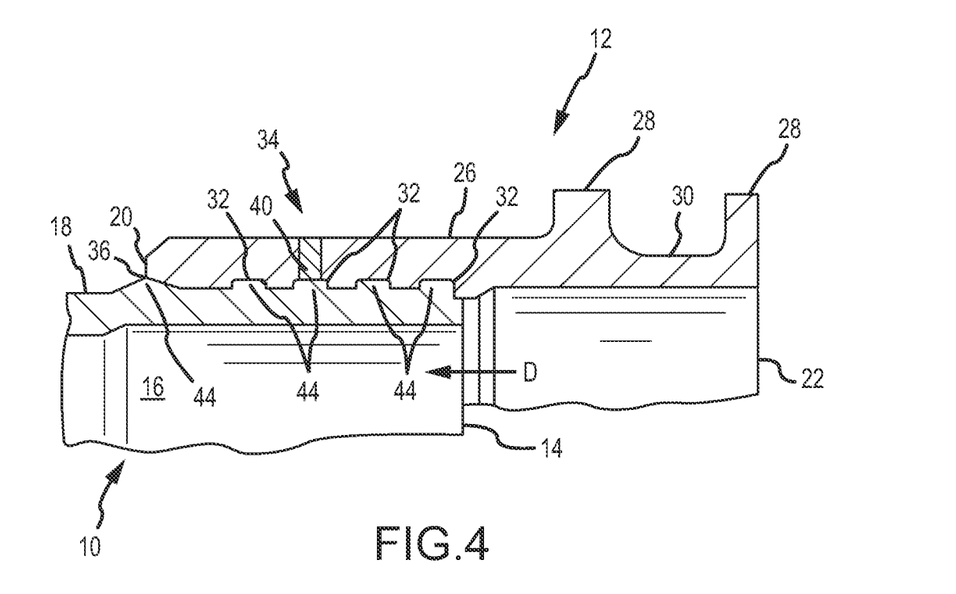
FIG. 4 is an enlarged fragmentary cross-sectional view of FIG. 3, illustrating the tube and flange connected after swaging, in which indicator material is displaced through the aperture.

Referring to FIG. 4, a swaging operation is conducted in which a swage tool or ram (not shown) is inserted through the flange 12 in the direction of the arrow D, thereby expanding the interior diameter of the tube 10 and displacing tube material 44 into the grooves 32. Tube material 44 also fills the gap adjacent the expanded interior edge 36.

As the tube material 44 enters the groove 32 containing the end of the slug of indicator material 40, the slug is displaced and pushed through the aperture 34 such that the recessed area 42 becomes filled with the indicator material 40. In a preferred embodiment, a proper swaging operation is signified by the indicator material 40 residing flush or nearly flush with the exterior surface 26 of the flange 12. As can be appreciated, if the indicator material has been only partially displaced so that it is not flush or nearly flush with the exterior surface 26, this indicates that the tube material 44 did not properly fill the groove 32 at that location, and therefore an incomplete connection may exist between the tube and the flange. During visual inspection, it would be apparent to the user/inspector that the swaging operation was not successful, since the indicator material would be difficult to view, or perhaps not visible at all if the indicator material remained deep enough within the aperture 34.

Preferably, the indicator material 40 is capable of being displaced within a cold forming swaging operation, and therefore does not require heating. The fill material is preferably electrically conductive and corrosion resistant. Further, the fill material is preferably substantially incompressible so that the protruding end of the slug within the groove does not inadvertently mushroom and spread out against the interior surface of the groove 32 as the tube material 44 enters the groove and makes contact with the end of the slug. Accordingly, substantially linear movement of the indicator material through the aperture 34 is desirable.

Figure 5:
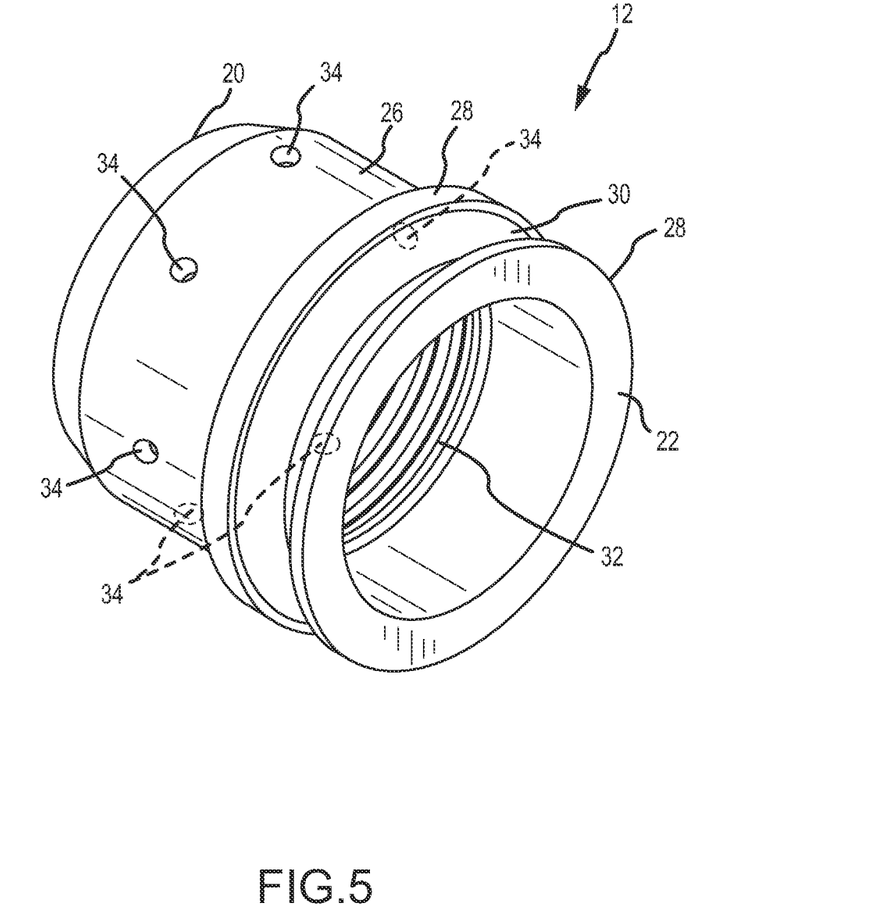
FIG. 5 is a fragmentary perspective view of a plurality of indicator apertures formed in a flange according to another preferred embodiment of the invention.

Referring to FIG. 5, another embodiment of the visual indicator is shown in which a plurality of apertures 50 is formed on a flange 12. More specifically, the apertures 50 are preferably located in a spiral pattern. According to this spiral arrangement of apertures 50, a visual inspection can be conducted for not only radially dispersed locations, but also longitudinally or axially dispersed locations. By providing a group of apertures in this pattern, a user/inspector can confirm proper connection between the tube and flange which otherwise may not be detectable with a single aperture. For example, slight misalignment of the swaging tool may cause incomplete compression of the tube material into certain portions of the grooves 32; however, there will be other locations in which the tube material is not displaced fully into the grooves. A single aperture located over the area of complete compression will not necessarily provide an indication of the success of the swaging operation, since area(s) of incomplete compression cannot be seen. With the spiral pattern of apertures, any appreciable misalignment or other defects in the swaging process that may not result in adequate compression of the tube material into the grooves has a much higher likelihood of being detected since viewing areas are provided longitudinally along the joints and radially around the joint. This spiral pattern of apertures is preferable over a linear arrangement of apertures, since such a linear arrangement may result in a weakened area being formed on the flange, depending upon the size of the apertures.

According to a method of the invention, a tube is placed within a flange having interior swaging grooves. The flange has at least one inspection point in the form of an aperture formed through the flange and aligned with one of the swaging grooves. The aperture includes a slug of indicator material that is initially recessed below an exterior surface of the flange. A swaging operation is conducted to expand the interior diameter of the tube such that the tube material is compressed or forced into the interior grooves of the flange. As the tube material enters the groove aligned with the aperture, the slug is pushed through the aperture towards the exterior surface of the flange. In this displaced location, the indicator material is made visible to a user/inspector. A plurality of inspection points may be provided in which a plurality of apertures are formed through the flange, each containing a slug of indicator material. A radial and axial/longitudinal arrangement of the apertures provides a more complete inspection capability in which the connection between the tube and flange is inspected for both radial and axial connection.

Figure 6:
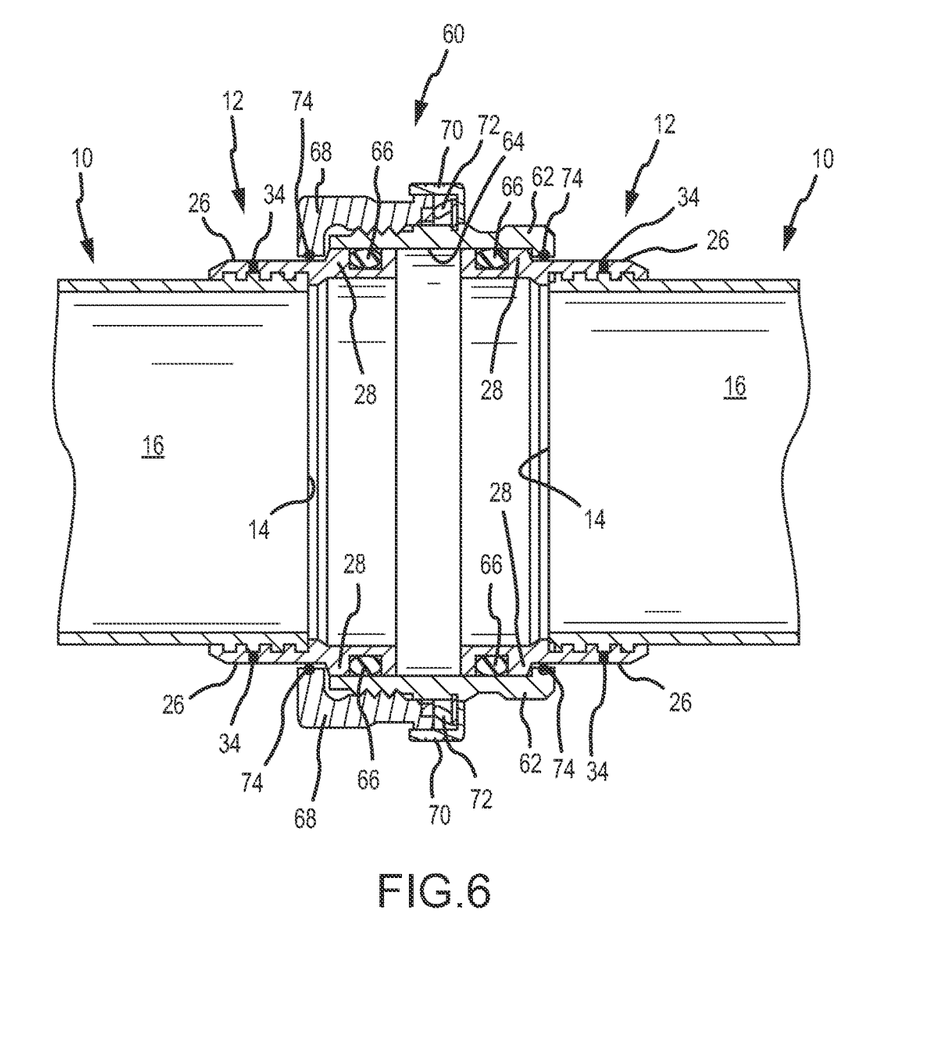
FIG. 6 is a cross sectional view of another embodiment of the invention defined as a combination including visual indicators for a pair of abutting flanges with corresponding conveying tubes joined by a coupling device.

Referring again to FIG. 6 in yet another aspect of the invention, a combination is illustrated including a pair of abutting flanges with corresponding conveying tubes joined by a coupling device. This combination provides a leak proof connection for axially aligned fluid conveying members in which both flanges can be inspected for adequate swaging between the flanges and their corresponding fluid conveying members. More specifically, FIG. 6 is a cross-sectional view of a coupler 60 with a design of that shown and described in the U.S. Pat. No. 6,050,609. A coupling device 60 interconnects facing flanges 12 each having corresponding tubes 10. The coupling device includes a coupler 62 that spans a gap between the facing surfaces of the flanges 12. The coupler 62 has a cylindrical body whose interior surface 64 is in contact with O-rings 66 to seal the connection between the flanges. A nut 68 is mounted on the coupler 62. Nut 68 has internal threads that engage external threads of the coupler, as shown. These pairs of threads enable the coupler 62 and nut 68 to be drawn together longitudinally to a locked position. A lock ring 70 is mounted over the coupler 62 and nut 68. The lock ring 70 includes an annular spring 72, mounted within a peripheral internal groove of the lock ring. The coupling device incorporates features to align the lock ring over the coupler 62 and nut 68 such that when aligned, the nut 68 can be rotated to a locked position, and the spring 72 enables the lock ring 70 to be maintained in a biased locking position. The nut 68 and coupler 62 include respective bonding wires 74 that maintain contact with the exterior surfaces of the flanges 12 to provide electrical continuity from the flanges across the coupling device. In the example of FIG. 6, the indicator apertures 34 are shown for illustration purposes as being located 180° apart from one another around the peripheries of the flanges; however, as noted with respect to FIG. 5, a spiral arrangement of apertures 34 is contemplated and therefore, the apertures are not required to be spaced from one another in any particular geometric arrangement except to avoid a plurality of indicator apertures arranged linearly. From a review of FIG. 6, it is apparent that the indicator apertures do not require any structural modification of the coupling device 60, and the apertures 34 are located such that an operator who may manipulate the coupling device also has a convenient visual opportunity to confirm an adequate connection between the respective flanges and tubes.

While one preferred embodiment has been described with respect to an internal swaging operation, it should understood that the invention is not limited to internal swaging, and the visual indicator could also be used in conjunction with an external swaging operation. The amount of visual indicator material placed in the corresponding aperture(s) can be selected to accommodate either type of swaging process.

There are number of advantages to the visual indicator device and method of the invention. The device and method provide for nondestructive inspection without having to significantly modify the construction of either the tube or flange. Further, the device and method do not compromise the general integrity of the tube or flange; therefore, no additional material must be used to join the components. An inspection can be conducted without the need for special equipment.

The foregoing invention has been described with respect to one or more preferred embodiments. However, it shall be understood that various changes and modifications can be made to the invention commensurate with the scope of the claims appended hereto.

What is claimed is:
1. A visual indicator for a fluid coupling comprising:
a fluid coupling component having a sidewall defining a hollow interior, and a plurality of swage grooves formed on an interior surface of said sidewall;
an aperture formed through said sidewall such that said aperture aligns with and intersects one of said grooves;
indicator material placed in said aperture and extending beyond said aperture into one of said swage grooves; and
a fluid conveying member connected to said fluid coupling component by a swaging process in which material from said fluid conveying member is compressed into said grooves, thereby displacing said indicator material within said aperture;

wherein the swaging process is successful when the indicator material resides flush or nearly flush with an exterior surface of the fluid coupling component.

2. A visual indicator, as claimed in claim 1, wherein:
said indicator material includes a slug of substantially non-compressible material that fills said aperture and subsequently travels through said aperture by force from said material of said fluid conveying member during swaging.

3. A visual indicator, as claimed in claim 1, wherein:
said indicator material has a color that differs from a color of said fluid coupling component, and said fluid conveying member.

4. A visual indicator, as claimed in claim 1, wherein:
said indicator material is resistant to corrosion.

5. A visual indicator, as claimed in claim 1, wherein:
said indicator material is electrically conductive and substantially matches conductivity of said fluid coupling component.

6. A visual indicator, as claimed in claim 1, wherein:
said fluid coupling component includes a flange having a first end connected to said fluid conveying member, and having a second end including a rib and a channel formed on said rib.

7. A visual indicator, as claimed in claim 1, wherein:
said aperture includes a plurality of apertures formed through said sidewall; and
said indicator material includes a plurality of indicator material slugs placed in corresponding apertures, each of said slugs having a first end extending beyond said aperture into a corresponding groove, and a second end retained within said aperture.

8. A visual indicator, as claimed in claim 7, wherein:
said plurality of apertures is formed in a spiral pattern around a circumference of said fluid coupling component.

9. A visual indicator, as claimed in claim 1, wherein:
said aperture is a cylindrical shaped hole formed through said sidewall, and said indicator material includes a cylindrical shaped slug sized to fit within said aperture; and
said cylindrical shaped slug is configured to retain substantially the same dimensions during displacement.

10. A visual indicator, as claimed in claim 1, wherein:
said indicator material has a first end extending beyond said aperture into said groove prior to swaging, and a second end of said indicator material is retained within said aperture.

11. A method of providing a visual indicator for a fluid conveying member, comprising:
providing a fluid coupling component having a sidewall defining a hollow interior, and a plurality of grooves formed on an interior surface of said sidewall;
forming an aperture through said sidewall such that said aperture aligns with and intersects one of said grooves;
placing indicator material in said aperture such that said indicator material has a first end extending beyond said aperture into said groove, and a second end of said indicator material is retained within said aperture;
providing a fluid conveying member and inserting one end of said fluid conveying member within said fluid coupling component; and
conducting a swaging process in which material from said fluid conveying member is compressed into said grooves, thereby displacing said indicator material within said aperture;
wherein the swaging process is successful when the indicator material resides flush or nearly flush with an exterior surface of the fluid coupling component.

12. A method, as claimed in claim 11, wherein:
as material from said fluid conveying member enters said groove during the swaging process, said indicator material is pushed through said aperture towards an exterior surface of said fluid coupling component and is made visible to a user.

13. A method, as claimed in claim 11, wherein:
said second end of said indicator material is substantially flush with an exterior surface of said fluid coupling component.

14. A method, as claimed in claim 11, including verifying that said swaging process was proper if said indicator material is externally visible, wherein:
said indicator material includes a slug of substantially non-compressible material that travels through said aperture by force from said material of said fluid conveying member during swaging.

15. A method, as claimed in claim 11, wherein:
said indicator material has a color that differs from a color of said fluid coupling component, and said fluid conveying member.

16. A visual indicator, as claimed in claim 11, wherein:
said fluid coupling component includes a flange having a first end connected to said fluid conveying member, and having a second end including a rib and a channel formed on said rib.

17. A visual indicator, as claimed in claim 11, wherein:
said aperture includes a plurality of apertures formed through said sidewall, and spaced from one another in a spiral pattern; and
said indicator material includes a plurality of indicator material slugs placed in corresponding apertures, each of said slugs having a first end extending beyond said aperture into a corresponding groove prior to swaging, and a second end retained within said aperture.

18. A visual indicator, as claimed in claim 11, wherein:
said aperture is a cylindrical shaped hole formed through said sidewall, and said indicator material includes a cylindrical shaped slug sized to fit within said aperture.

\* \* \* \* \*